United States Patent
Herloski et al.

(10) Patent No.: US 7,042,600 B2
(45) Date of Patent: May 9, 2006

(54) METHOD AND APPARATUS FOR ELIMINATING LAMP STROBING IN A DIGITAL INPUT SCANNER

(75) Inventors: Robert P. Herloski, Webster, NY (US); Joseph P. Taillie, Pittsford, NY (US)

(73) Assignee: Xerox Corporation, Stamford, CT (US)

( * ) Notice: Subject to any disclaimer, the term of this patent is extended or adjusted under 35 U.S.C. 154(b) by 934 days.

(21) Appl. No.: 10/040,718

(22) Filed: Jan. 7, 2002

(65) Prior Publication Data

US 2003/0128404 A1    Jul. 10, 2003

(51) Int. Cl.
*H04N 1/04* (2006.01)

(52) U.S. Cl. .............. 358/482; 358/474; 358/471; 250/234; 250/216

(58) Field of Classification Search .............. 358/475, 358/483, 509, 482, 512, 513–514, 474; 250/208.1, 250/234, 216, 218, 223, 229, 559.01; 348/324, 348/262
See application file for complete search history.

(56) References Cited

U.S. PATENT DOCUMENTS

| | | | |
|---|---|---|---|
| 4,074,320 A * | 2/1978 | Kapes, Jr ............... 358/482 |
| 4,305,650 A | 12/1981 | Knox |
| 4,324,466 A | 4/1982 | Takayama |
| 4,355,891 A | 10/1982 | Cole et al. |
| 4,707,122 A | 11/1987 | Lama et al. |
| 5,043,584 A | 8/1991 | Koishi |
| 5,144,448 A * | 9/1992 | Hornbaker et al. ......... 348/324 |
| 5,467,449 A * | 11/1995 | Gauronski et al. ........... 714/57 |
| 5,495,361 A * | 2/1996 | Cresens .................... 359/246 |
| 5,680,015 A | 10/1997 | Bernitz et al. |
| 5,744,795 A * | 4/1998 | Bianchi et al. ............ 250/234 |
| 5,852,292 A | 12/1998 | Blümcke et al. |
| 5,936,357 A | 8/1999 | Crouse et al. |
| 6,185,010 B1 * | 2/2001 | Watanabe ................... 358/474 |
| 6,453,127 B1 * | 9/2002 | Wood et al. ................... 399/8 |

* cited by examiner

*Primary Examiner*—Joseph R. Rokrzywa
*Assistant Examiner*—Heather D. Gibbs
(74) *Attorney, Agent, or Firm*—Fay, Sharpe, Fagan, Minnich & McKee, LLP

(57) ABSTRACT

A method of eliminating strobing in successive scan lines of an image includes determining a nominal scan line time and an associated scan line integration time for the image sensor. A nominal illumination light source output period is determined for the illumination source. In order to ensure that the scan line integration time is equivalent to an integer number of illumination source light output periods, at least one of the nominal scan line integration time and the nominal illumination source light output period is adjusted. A clock signal, derived from the pixel clock, drives both the frequency circuitry of the lamp drive circuit and the integration time of the image sensor. The present method provides a reliable means for eliminating lamp strobing independent of the relative phasing of the lamp oscillation phase with respect to the start of each scan line integration.

14 Claims, 3 Drawing Sheets

METHOD AND APPARATUS FOR ELIMINATING LAMP STROBING IN A DIGITAL INPUT SCANNER

BACKGROUND OF THE INVENTION

The present invention relates to image scanning systems having AC illumination drives. It finds particular application in conjunction with a method and apparatus for eliminating lamp strobing in an optical scanning system, and will be described with particular reference thereto. It is to be appreciated, however, that the invention will also find application in conjunction with eliminating lamp strobing in a variety of image acquisition and output devices, such as scanners and xerographic copiers.

In imaging and scanning systems employing a time varying illumination source, there is the potential for process-direction nonuniformities to occur. More particularly, because the illuminator or lamp output fluctuates periodically in response to the lamp power supply, the summation or integration of lamp irradiance during a given scan line integration may vary from scan line to scan line, depending upon the time varying phase of the lamp power supply. Such a variation in integrated lamp irradiance from scan line to scan line causes image nonuniformities, such as strobing, i.e., varying degrees of image brightness between scan lines.

One solution to the strobing problem involves phase synchronization between the lamp power supply and the effective integration time. In other words, phase synchronization requires that the effective start of integration for each scan line occurs at the same relative phase in the lamp power supply oscillation. In this case, even if there are not an integral number of lamp periods per scan line integration time, the integrated irradiance signal remains the same from scan line to scan line. However, the effectiveness of phase synchronization depends on the stability of the lamp power supply in frequency or period. Any variation in the period of the lamp power supply will induce a strobing nonuniformity into the image.

The present invention contemplates a new and improved method and apparatus for eliminating lamp strobing in a scanning system, which overcomes the above-referenced problems and others.

SUMMARY OF THE INVENTION

In accordance with one aspect of the present invention, a scanning system includes an illumination source, having a time varying output controlled by a drive circuit, and an image sensor, which is driven by a pixel clock, for scanning successive scan lines of an image. In the scanning system, a method of eliminating strobing in the successive scan lines of the image includes determining a nominal scan line time and an associated scan line integration time for the image sensor. A nominal illumination source light output period is determined. At least one of the scan line integration time and the illumination source light output period is adjusted such that the scan line integration time is equivalent to an integer number of illumination source light output periods.

In accordance with a more limited aspect of the present invention, the method includes feeding a pixel clock signal or a signal derived from a pixel clock into the lamp drive circuit to drive the illumination source at a frequency corresponding to the adjusted light output period.

In accordance with a more limited aspect of the present invention, the pixel clock signal is used to synchronize a relative phase of the illumination source light output and a start time of the image sensor integration for each scan line.

In accordance with a more limited aspect of the present invention, if a given scan line integration time is required, the adjusting step includes calculating a ratio of the required scan line integration time and the nominal illumination light output period. If the calculated ratio is a non-integer, the ratio is rounded to the nearest integer value. The required scan line integration time is divided by the integer value in order to yield an adjusted illumination source light output period.

In accordance with a more limited aspect of the present invention, if a given illumination source light output period is required, the adjusting step includes calculating a ratio of the nominal scan line integration time and the required illumination light output period. If the calculated ratio is a non-integer, the ratio is rounded to the nearest integer value. The required illumination source light output period is multiplied by the integer value to yield an adjusted scan line integration time.

In accordance with another aspect of the present invention, a method of scanning a document includes illuminating the document with a lamp having a time varying light output and scanning successive scan lines of the illuminated document with a line scanner. At least one of the nominal light output period of the lamp and the nominal scan line integration time of the scanner is adjusted such that the scan line integration time of the scanner is equivalent to an integer number of lamp light output periods. The lamp and scanner are driven in accordance with the adjusted light output period and scan line integration time using a common pixel clock signal.

In accordance with another aspect of the present invention, a xerographic imaging system for reproducing an image representation of a document includes a planar imaging platen and a lamp having a time varying output for illuminating the document on the platen. Scanning means are employed for scanning successive scan lines of the document. A controlling means controls the light output period of the lamp and the scan line integration time of the scanning means such that the scan line integration time is equivalent to an integer number of lamp light output periods. An image charge pattern is transferred onto a photoreceptor. At least one developing station develops the charge pattern and at least one fuser station fixes the developed image onto a physical media.

In accordance with a more limited aspect of the present invention, the controlling means includes a frequency control processor which adjusts at least one of the light output period of the lamp and the scan line integration time of the scanning means. A pixel clock provides a drive signal for driving both the lamp and the scanning means.

One advantage of the present invention resides in frequency synchronization of the lamp power supply and the image sensor integration.

Another advantage of the present invention resides in elimination of lamp strobing independent of the relative phasing of the scanning integration time and the lamp oscillation.

Still other benefits and advantages of the present invention will become apparent to those skilled in the art upon a reading and understanding of the preferred embodiments.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

DETAILED DESCRIPTION OF THE PREFERRED EMBODIMENTS

Figure 1:
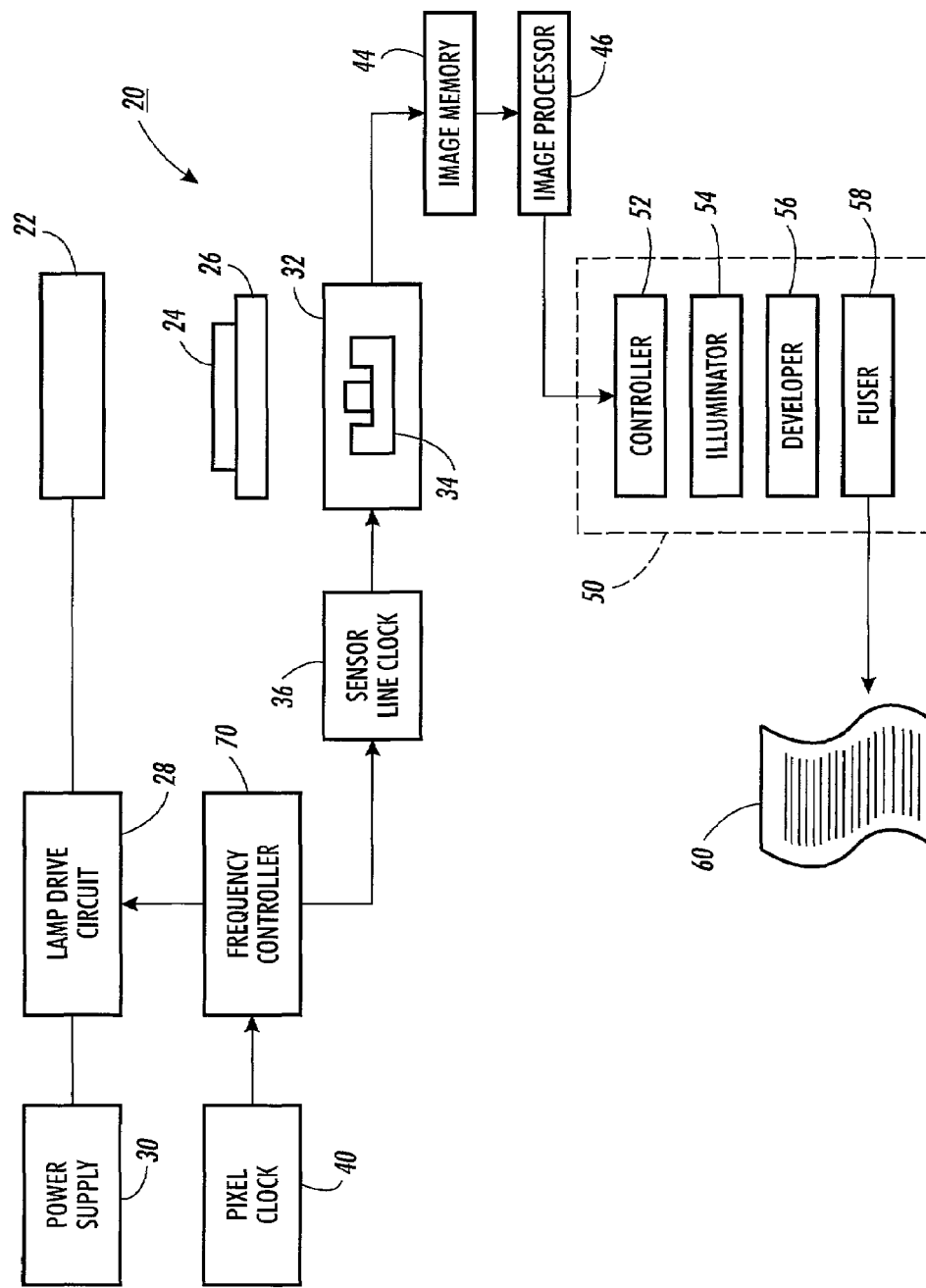
FIG. 1 is a functional block diagram of an image system suitable to practice an embodiment of the present invention.

With reference to FIG. 1, an imaging system, which eliminates lamp strobing in a scanned image, is illustrated. The imaging system includes a scanning system 20 in which a scanner illumination source 22, such as a fluorescent lamp, illuminates a document 24 supported on a document platen 26. In one embodiment, the scanner illumination source 22 is a xenon lamp, which is driven in a time varying manner by a lamp drive circuit 28. The lamp drive circuit 28 receives an AC input signal from a power supply 30. The document 24 is scanned in a conventional linewise manner using a scanner 32. The scanner 32 includes a lens (not shown) and a line sensor 34, such as a CCD (charge coupled device) line sensor. A sensor line clock 36 generates a line signal for controlling the scan line time for each scan line. Artisans will appreciate that the duration of each scan line is dependent upon specific system criteria, such as the available brightness output of the scanner illumination source, the characteristics of the CCD line sensor, and the required signal to noise ratio. As is described more fully below, both the lamp drive circuit 28 and the sensor line clock 36 are driven by a clock signal derived from a pixel clock 40. While the present invention is being described in terms of a transmissive scanning system, it is to be appreciated that it is applicable to other scanning systems, such as reflective scanning systems.

Scanning the document 24 produces electrical scanned image data, which is collected in a scan line by scan line manner and stored in an image data memory 44. The image data is transferred to an image processor 46 for a processing, such as brightness and skew correction. The processed image data is then output to one of a plurality of image output devices, such as a xerographic printer 50. In this embodiment, a digital image representation is transferred to an image processing controller 52. The controller 52 communicates the image data to the remainder of the printing machine, including an illuminator 54, which transfers a physical image onto a photosensitive surface, at least one developer station 56, and a fuser station 58, which produces a hard copy 60 of the scanned image. Alternatively, the digital image representation is output to a computer or network.

More particularly, in the practice of conventional xerography, an electrostatic latent image is formed on a xerographic surface by first uniformly charging a charge retentive surface, such as a photoreceptor. The charged area is selectively dissipated in accordance with a pattern of activating radiation corresponding to original images. The selective dissipation of the charge leaves a latent charge pattern on the imaging surface corresponding to the areas not exposed by radiation.

The charge pattern is made visible by developing it with toner by passing the photoreceptor past at least one developer station 56. The toner is generally a black or colored powder, which adheres to the charge pattern by electrostatic attraction. The developed image is then fixed to the imaging surface or is transferred to a receiving substrate such as plain paper or other physical media to which it is fixed by suitable fusing techniques.

In order to eliminate lamp strobing effects in the scanned image, a frequency control processor 70 controls the operating frequencies of the lamp 22, through the lamp drive circuit 28, and the line sensor 34, through the sensor line clock 36. As is described more fully below, the frequencies of the lamp 22 and the line sensor 34 are coupled such that for each scan line, there are an integer number of lamp light output periods or cycles per scan line integration time. Based on the nominal lamp light output frequency/period and the nominal scan line integration time, the frequency control processor 70 calculates the number of lamp light output periods per nominal scan line integration time. If the nominal lamp frequency and scan line integration time correspond to a non-integer number of lamp light output periods per scan line integration time, the frequency control processor 70 adjusts either both of the lamp light output period and the scan line integration time to force an integer relationship between the two.

Because frequency stability in the lamp drive circuit 28 is essential in order to maintain an integer number of lamp output periods per scan line integration time throughout the entire scan of the image, a clock signal derived from the pixel clock 40 is used to drive both the lamp 22, through the lamp drive circuit 28, as well as the line sensor 34, through the sensor line clock. In other words, the pixel clock 40 generates a pixel clock signal, which is passed through the frequency control processor 70 to drive both the lamp 22 and the line sensor 34 in accordance with the aforementioned integer relationship. In other words, the pixel clock 40 generates a drive signal to control the lamp 22 and the line sensor 34, such that if there are N pixel clock periods per scan line integration time, and M pixel clock periods per lamp cycle of light output, where N/M is an integer.

Figure 2:
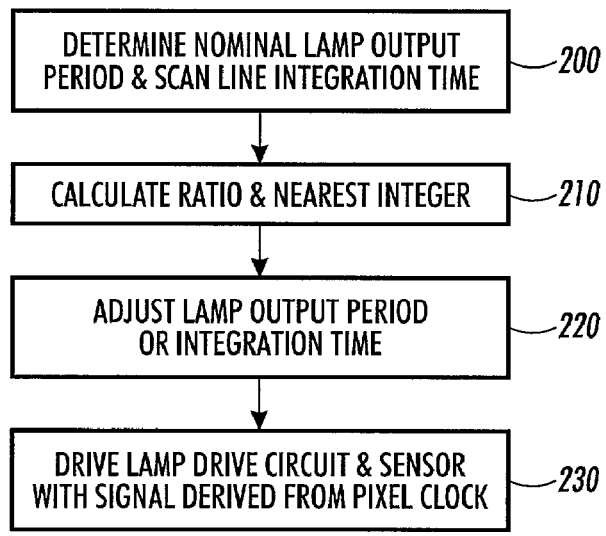
FIG. 2 is a flow chart illustrating the method of eliminating lamp strobing in a scanner in accordance with the present invention.

With reference to FIG. 2 and continuing reference to FIG. 1, a method of eliminating strobing in successive scan lines of an image is provided. The method includes determining 200 a nominal lamp output frequency/period along with a nominal scan line integration time. The ratio of the number of lamp output periods per scan line integration time is calculated 210, along with the nearest integer value. In response to the calculating step 210, either the scan line integration time or the lamp output period is adjusted 220 in accordance with the calculated nearest integer. In other words, the lamp output period and/or the scan line integration time are adjusted such that there are an integer number of lamp output cycles per scan line integration time. It is to be appreciated that if this condition is met, the relative phasing of the lamp output oscillation at the effective start of integration for each scan line is irrelevant because the integral over an integer number of full periods of a periodic function is independent of the starting phase. A pixel clock signal or a signal derived from the pixel clock signal is used to drive 230 both the frequency circuitry of the lamp drive circuit and the integration time of the line sensor in accordance with the integer relationship between the two.

Figure 3:
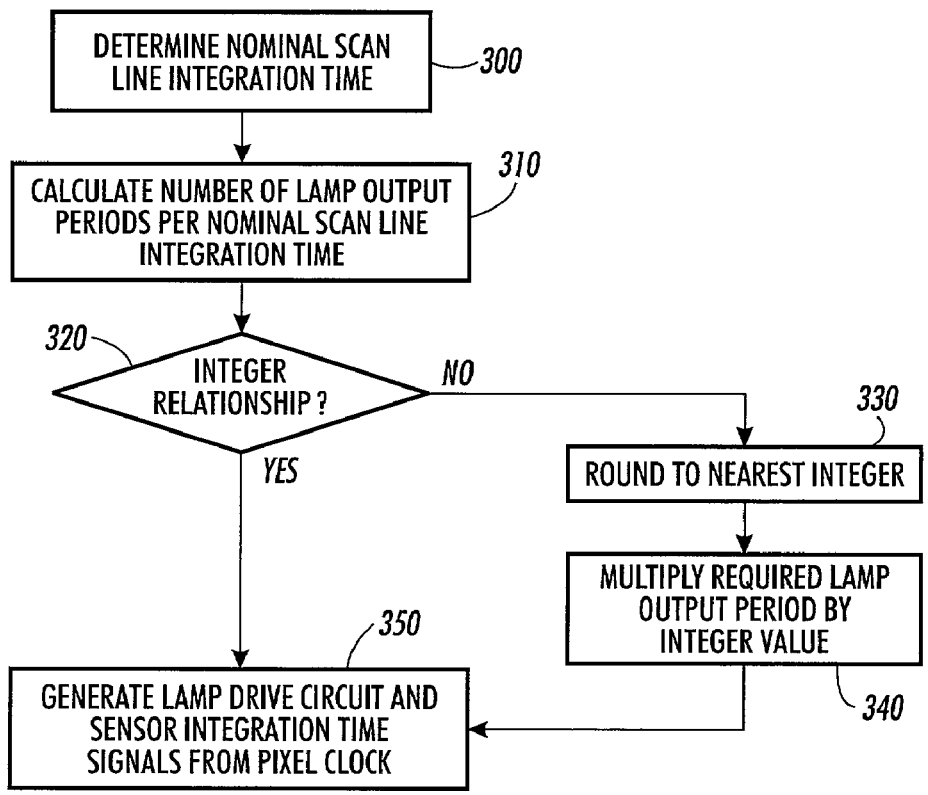
FIG. 3 is a flow chart illustrating one embodiment of the method of eliminating lamp strobing in accordance with the present invention.
Figure 4:
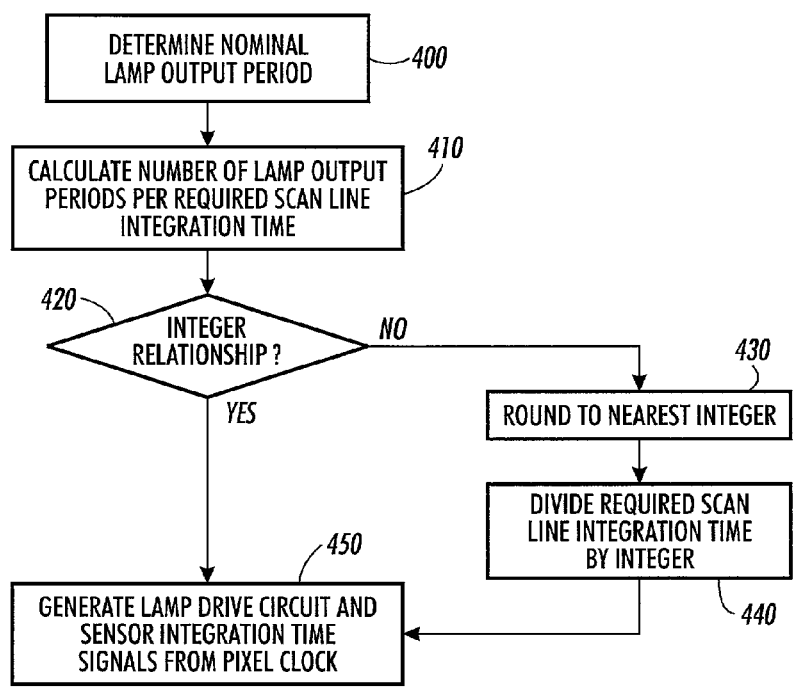
FIG. 4 is a flow chart illustrating another embodiment of the method of eliminating lamp strobing in accordance with the present invention.

With reference to FIG. 3 and FIG. 4, preferred embodiments of the method illustrated in FIG. 2 are provided. In FIG. 3, if a given lamp output frequency/period is required, the nominal scan line integration time is determined 300. Based on the required lamp output period and the nominal scan line integration time, the number of lamp output periods per nominal scan line integration time is calculated 310. It is then determined whether the calculated number is an integer 320. If an integer relationship does not exist, the calculated number of lamp output periods per nominal scan line integration time is rounded 330 to the nearest integer. The required lamp output period is multiplied 340 by the nearest integer value, yielding a new scan line integration time. Based on the above calculations, a pixel drive signal is generated 350 to drive both the lamp and the line sensor.

For example, in a given system, a nominal scan line time is 78.43 μsec, while the lamp output frequency is 70 KHz (corresponding to a lamp outputriod of 14.29 μsec). Artisans will appreciate that in a digital scanner, there is a difference between the total scan line time and the scan line integration time. More particularly, the total scan line time is greater than the scan line integration time, allowing additional time for image processing overhead. The ratio between the nominal scan line time and lamp light output period is 78.43 μsec/14.29 μsec=5.488. In one embodiment, in order to force an integer relationship between the scan line integration time and the lamp light output period, the integration time is set to be 71.45 μsec, which is five times the lamp output period. In other words, the lamp and line sensor will operate such that there are five lamp output cycles per single scan line integration time, thus preventing any strobing effect from appearing in the image.

In FIG. 4, if a given scan line integration time is required, the nominal lamp output period is determined 400. Based on the nominal lamp output period and the required scan line integration time, the number of lamp output periods per required scan line integration time is calculated 410. It is determined 420 whether the calculated number is an integer. If an integer relationship does not exist, the calculated number is rounded 430 to the nearest integer. The required scan line integration time is then divided 440 by the nearest integer, yielding a new lamp output frequency/period. Based on the above calculations, a pixel clock drive signal is generated 450 to drive both the lamp and the line scanner.

In an alternate embodiment of the example above, the nominal scan line integration time is required to be 74.52 μsec, which corresponds to a nominal total scan line time of 78.43 μsec * (4960 image pixels/5220 effective pixels including overhead). In this case, in order to force an integer relationship between the scan line integration time and the lamp output period, the lamp output period must be adjusted to 14.904 μsec=74.52 μsec/5, which is equivalent to a lamp light output frequency of 67.1 KHz. Again, both the lamp drive circuit and the CCD line sensor are driven by a signal derived from the pixel clock. If there are N pixel clock periods per scan line integration time and M pixel clock periods per lamp cycle of light output, then N/M is an integer. In the above example N=4960 and M=4960/5=992.

The invention has been described with reference to the preferred embodiment. Modifications and alterations will occur to others upon a reading and understanding of the preceding detailed description. It is intended that the invention be construed as including all such modifications and alterations insofar as they come within the scope of the appended claims or the equivalents thereof.

The invention claimed is:

1. In a scanning system including an illumination source having a time varying output controlled by a drive circuit and an image sensor driven by a pixel clock for scanning successive scan lines of an image, a method of eliminating strobing in the successive scan lines of the image comprising:
    determining a nominal scan line time and an associated scan line integration time for the image sensor;
    determining a nominal illumination source light output period;
    adjusting at least one of (i) the nominal scan line integration time and (ii) the nominal illumination source light output period such that the scan line integration time is equivalent to an integer number of illumination source light output periods.

2. The method as set forth in claim 1, further comprising:
    feeding one of (i) a pixel clock signal, and (ii) a signal derived from a pixel clock into the drive circuit to drive the illumination source at a frequency corresponding to the adjusted light output period.

3. The method as set forth in claim 2, further comprising:
    using the pixel clock signal, synchronizing (i) a relative phase of the illumination source light output and (ii) a start time of the image sensor integration for each scan line.

4. The method as set forth in claim 2, wherein if a given scan line integration time is required, the adjusting step includes:
    calculating a ratio of the required scan line integration time and the nominal illumination source light output period;
    if the calculated ratio is a non-integer, rounding the ratio to a nearest integer value; and
    dividing the required scan line integration time by the integer value to yield an adjusted illumination source light output period.

5. The method as set forth in claim 2, wherein if a given illumination source light output period is required, the adjusting step includes:
    calculating a ratio of the nominal scan line integration time and the required illumination light output period;
    if the calculated ratio is a non-integer, rounding the ratio to a nearest integer value; and
    multiplying the required illumination source light output period by the integer value to yield an adjusted scan line integration time.

6. The method as set forth in claim 1, further comprising:
    using a drive signal from the pixel clock, driving (i) the illumination source at a frequency corresponding to the adjusted light output period and (ii) the image sensor at a scan line frequency corresponding to the adjusted scan line integration time.

7. A method of scanning a document, said method comprising:
    illuminating the document with a lamp having a time varying light output;
    scanning successive scan lines of the illuminated document with a line scanner;
    adjusting at least one of (i) a nominal light output period of the lamp and (ii) a nominal scan line integration time of the scanner such that the scan line integration time of the scanner is equivalent to an integer number of lamp light output periods; and
    driving the lamp and the scanner in accordance with the adjusted light output period and scan line integration time using a common pixel clock signal.

8. The method as set forth in claim 7, further comprising:
using the pixel clock signal, synchronizing (i) a relative phase of the lamp light output and (ii) a start time of the scanner integration time for each scan line.

9. The method as set forth in claim 7, wherein if a given scan line integration time is required, the adjusting step includes:
calculating a number of nominal lamp light output periods within the required scan line integration time;
if the calculated number is a non-integer, rounding the number down to a nearest integer value; and
dividing the required scan line integration time by the integer value to yield an adjusted lamp light output period.

10. The method as set forth in claim 7, wherein if a given lamp light output period is required, the adjusting step includes:
calculating a number of required lamp light output periods with the nominal scan line integration time;
if the calculated number is a non-integer, rounding the number down to a nearest integer value; and
multiplying the required lamp light output period by the integer value to yield an adjusted scan line integration time.

11. A document scanner system for scanning a document comprising:
a lamp having a time varying light output positioned to illuminate the document;
a scanner configured to scan successive scan lines of the illuminated document;
an adjustment system designed to adjust at least one of (i) a nominal light output period of the lamp or (ii) a nominal scan line integration time of the scanner, wherein the scan line integration time of the scanner is made equivalent to an integer number of lamp light output periods of the lamp; and
a pixel clock configured to generate a pixel clock signal implemented to drive the lamp and the scanner in accordance with the adjusted light output period and scan line integration time using the pixel clock signal.

12. The document scanner system according to claim 11, wherein the adjustment system includes:
a frequency control processor which adjusts the at least one of (i) the nominal light output period of the lamp and (ii) the nominal scan line integration time of the scanner.

13. The document scanner system according to claim 12, further comprising:
a planar imaging platen on which the document is positioned and the planar imaging platen is located to receive the time varying light output of the lamp for illuminating the document on the platen.

14. The document scanner system of claim 13, including:
a transfer station configured and positioned for transfer of an image charge pattern onto a photoreceptor;
a developing station configured and positioned to develop the charge pattern; and
a fuser station configured and positioned to fix a developed image of the charge pattern onto a physical media.

* * * * *